United States Patent [19]

Carlson

[11] 4,420,829
[45] Dec. 13, 1983

[54] HOLOGRAPHIC SYSTEM FOR THE STORAGE OF AUDIO, VIDEO AND COMPUTER DATA

[76] Inventor: John E. Carlson, 3440 E. Pontaluna, Fruitport, Mich. 49415

[21] Appl. No.: 223,284

[22] Filed: Jan. 8, 1981

[51] Int. Cl.³ .............................................. G11B 7/00
[52] U.S. Cl. .................................. 369/103; 358/342; 365/125
[58] Field of Search ............... 369/103, 275, 109, 121, 369/110, 44–46, 32; 358/342, 347; 365/125, 121, 216, 124; 350/3.75, 3.77, 3.8

[56] References Cited

U.S. PATENT DOCUMENTS

| | | | |
|---|---|---|---|
| 3,392,400 | 7/1968 | Lamberts et al. | 365/121 X |
| 3,657,473 | 4/1972 | Corcoran | 369/103 |
| 3,753,249 | 8/1973 | Silverman | 369/103 X |
| 3,770,886 | 11/1963 | Kiemle | 369/103 X |
| 3,812,496 | 5/1974 | Brooks | 369/125 X |
| 3,842,197 | 10/1974 | Broussaud et al. | 369/103 |
| 3,848,096 | 11/1974 | Marko | 369/103 |
| 3,903,360 | 9/1975 | Kamisaka et al. | 369/103 X |
| 4,021,606 | 5/1977 | Takeda et al. | 358/342 |
| 4,025,731 | 5/1977 | Rembault | 369/103 X |
| 4,104,489 | 8/1978 | Satoh et al. | 365/125 X |
| 4,224,480 | 9/1980 | Satoh et al. | 365/125 X |
| 4,295,162 | 10/1981 | Carlsen | 369/44 X |

Primary Examiner—Bernard Honick
Assistant Examiner—Donald McElheny, Jr.
Attorney, Agent, or Firm—Stephenson and Boller

[57] ABSTRACT

A rotating disc-shaped carrier upon which have been recorded audio, video or computer data in holographic form, a method for forming such a carrier, and an apparatus for reading such a carrier is disclosed. A beam of coherent radiation is spatially modulated in a prescribed way, this beam then illuminating one radial of a rotating carrier upon which has been recorded a series of holograms in the form of a spiral track or series of concentric tracks. The holograms are elongated in a direction perpendicular to movement of the rotating carrier and overlap in directions both parallel and perpendicular to such movement, the amount of overlap in the perpendicular direction being inversely proportional to the amount of overlap in the parallel direction such that data storage density remains constant across the surface of the rotating carrier. The sequentially illuminated holograms generate a series of signal images which vary in amplitude, width, spatial frequency, azimuth or position relative to a centerline. Detection of the signal images and extraction of uncorrelated noise resulting from a coded reference beam multiplexing procedure are accomplished by means of a differential photodetection system. All virtual signal images generated by holograms occuring within one illuminated radial of the rotating carrier are confined to a specific distance from a point in space on the side of the rotating carrier opposite to that of the virtual signal images, at which point is placed a rotatable photodetection system such that alignment between the photodetection means and any signal image within one radial requires only rotary movement of the photodetection system. Toleration of lateral misalignment between signal images and the photodetection means is accomplished by elongation of signal images in a direction substantially perpendicular to the signal image path, or by employment of point-source-type signal images which are detected by a transversely-positioned array of differentially-operating pairs of photosensors.

24 Claims, 21 Drawing Figures

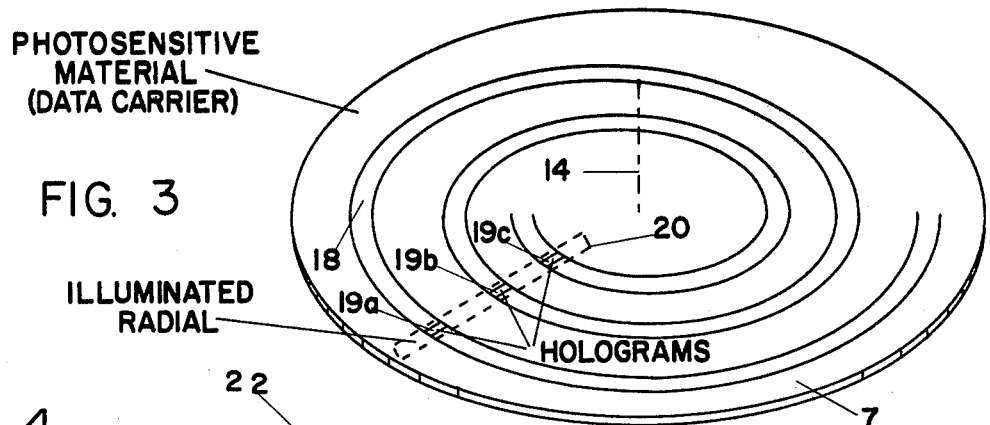
FIG. 3
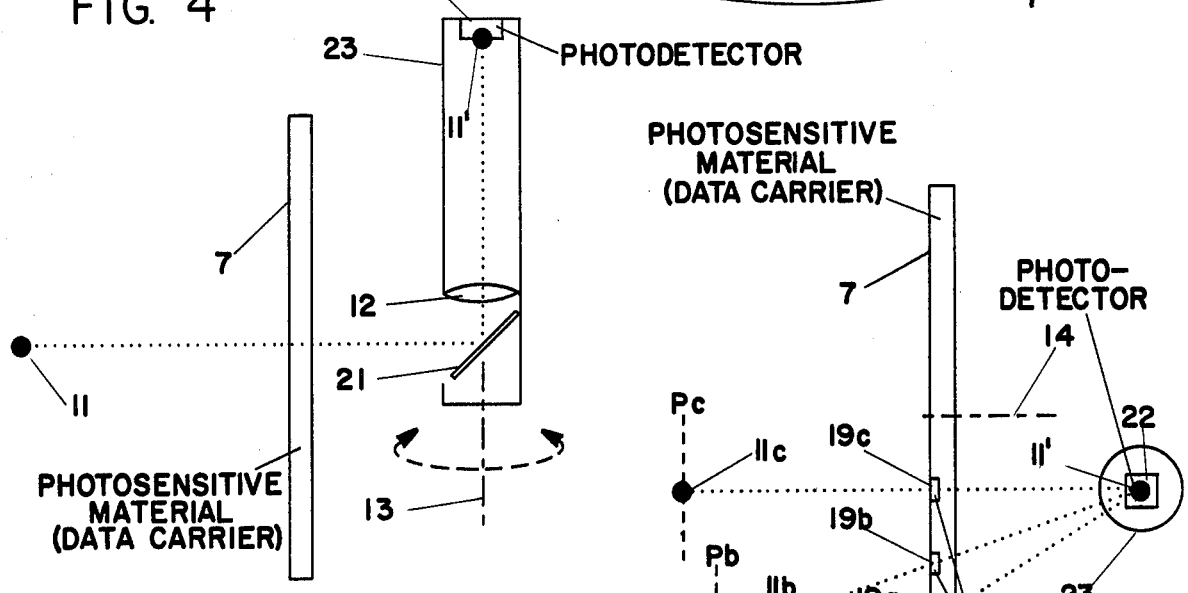
FIG. 4
FIG. 5
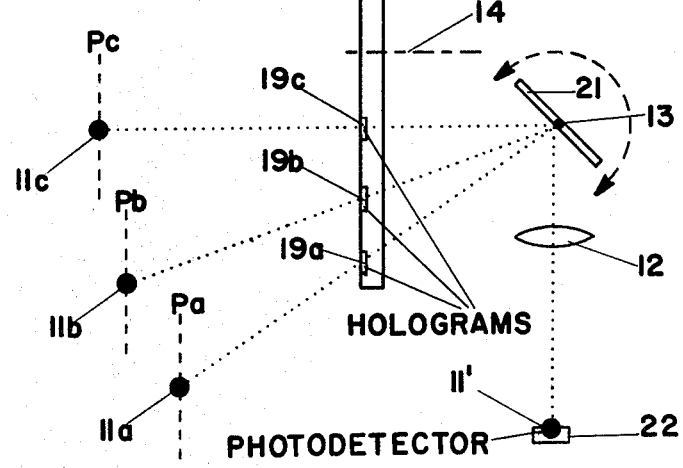
FIG. 6

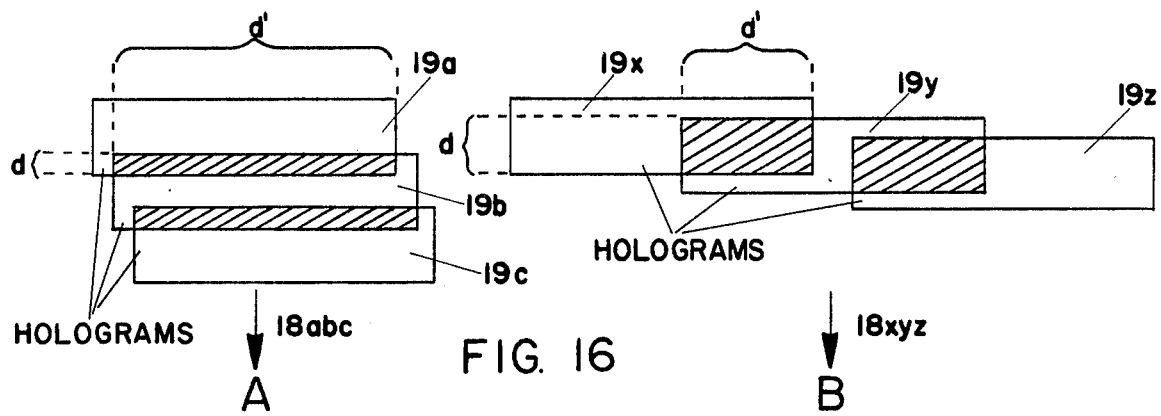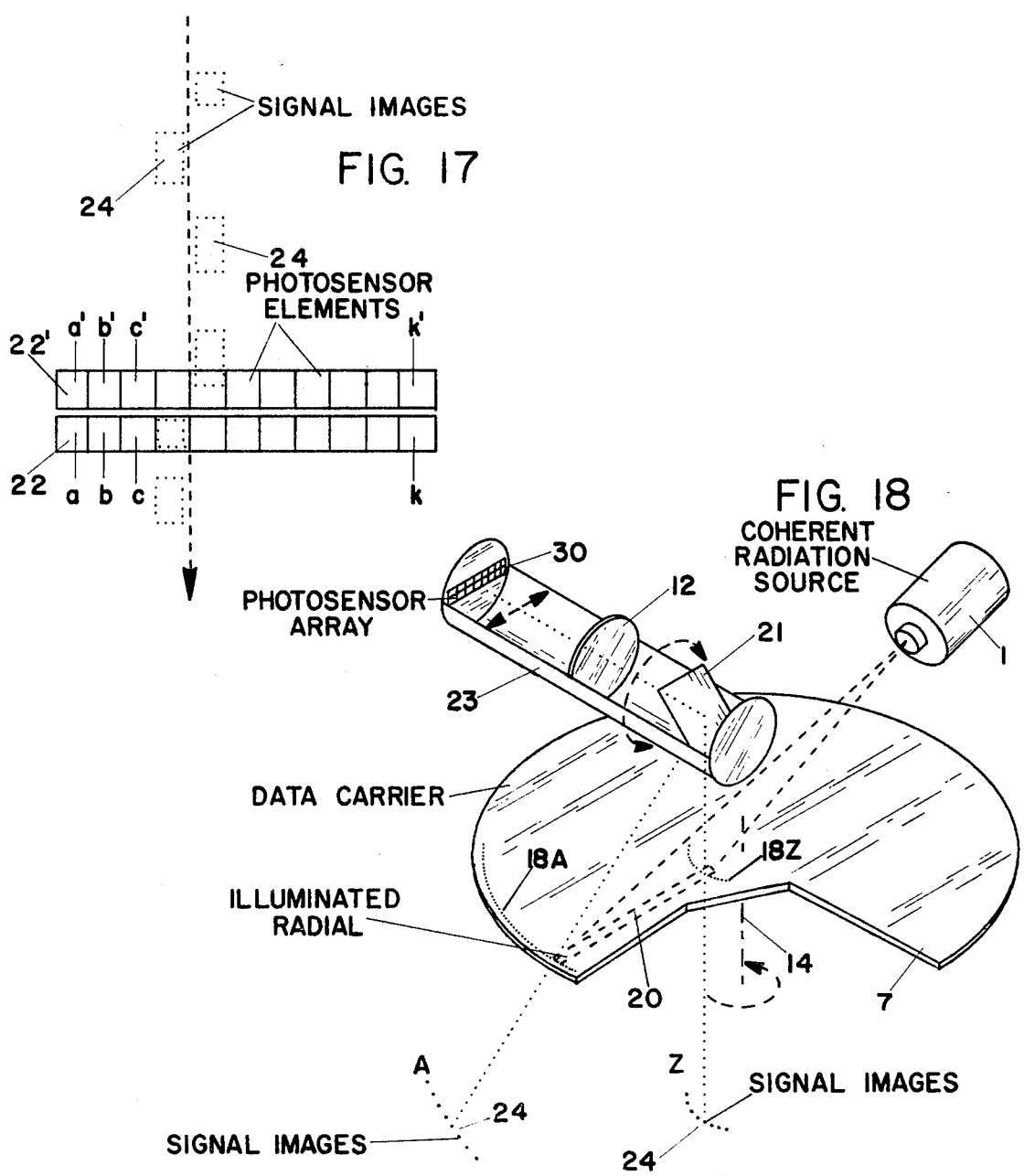

HOLOGRAPHIC SYSTEM FOR THE STORAGE OF AUDIO, VIDEO AND COMPUTER DATA

BACKGROUND OF THE INVENTION

1. Field of the Invention

This invention relates to a holographic information storage apparatus, and more particularly to an apparatus which stores audio, video or computer data in holographic form upon a rotating disc.

2. Description of the Prior Art

The desire for an alternative to the familiar LP record has led to the invention of numerous information storage devices. These devices, using either analog or digital formats, attempt to alleviate the deficiencies inherent in the LP record, and provide a medium for the storage of video as well as audio information. Two serious shortcomings associated with the LP record are noise (caused by scratches, dust, wear, manufacturing imperfections and mechanical motion) and limitations of frequency response imposed by mechanical detection of the signal, the latter problem preventing the LP record from becoming a medium for the storage of video information.

Prior-art devices which seek to correct these deficiencies have spawned many new problems, not the least of which is the relatively high costs associated with the manufacturing of both the playback devices and copies of the recorded medium, these costs being attributable, in part, to the close mechanical tolerances necessary for proper operation. Devices which do not rely upon a tracking groove on the surface of the recorded medium frequently resort to a sensing element along with a servo-feedback system for keeping the data-track centered with respect to the signal detection element; this mechanism contributes significantly to manufacturing cost. Other devices, employing optical detection of a signal, attempt to solve the tracking-error problem by exploiting the spatially-invarient characteristics inherent in certain hologram-forming geometries (Fourier-transform holograms); carried to the extremes necessary for allowing abandonment of a servo-feedback system, this solution severely limits the data storage capacity of the medium.

Some devices are intended to offer application in the area of computer data storage (in the form of a read-only block-access memory system) in addition to serving as an audio and video playback mechanism. However, to accommodate all three of the above applications requires either extensive modification of the device or inclusion of one or more additional elements, both solutions contributing to large increases of overall cost. Of particular significance is the signal detection apparatus; unless the design of this apparatus permits very rapid access to separate blocks of data on the recorded medium the utility of any information storage system is seriously compromised when applied to computer data storage. A device which permits the simultaneous storage of audio, video and computer data upon the same recorded medium is advantageous especially where primary application for such a device will be found in the home; prior art devices do not offer such multiple applications at a cost which is acceptable within the consumer marketplace.

Devices which store information in the form of a spiral track or series of concentric tracks upon a rotating disc encounter a problem associated with nonuniform data-density storage. That is, a disc presents much longer tracks and therefore more potential data storage space at its perimeter than exists toward its center; moving at constant rotational speed a disc wastes the potential for greater data-density which exists at the outer portions of a spiral track. Prior-art devices attempt to solve this problem either by adjusting the speed of rotation of the disc, or by providing a separate timing signal during playback. Both solutions increase cost and complexity, but the present invention provides an inexpensive solution which is intrinsic in the concept of the device.

Holographic data storage devices offer certain advantages over other optical systems, among the most important being data redundancy and the capacity for copies of the recorded medium to be manufactured by a pressing or stamping process as is well known in the art. Data redundancy not only alleviates the problem of noise created by dust, wear and scratches upon copies of a master, but also contributes to the low cost of mass-producing these copies by eliminating the necessity for maintaining a totally sterile environment during the manufacturing process. The production of holographic copies could be accomplished by passing a continuous thin sheet of either transparent or reflective material between two rotating drums, one of which would contain a relief pattern upon its surface (the master) and the other drum would be either of smooth surface or a second master (in the case of a record containing data on both sides). The resulting embossed hologram copies would be covered on each side with transparent material for protection, stiffening and labeling purposes, then cut to appropriate dimensions. The production speed and high volume attainable by such a process would match that which is commonplace within the publishing industry, and the manufacturing cost per copy would be very low.

A further advantage of holographic systems is afforded by the capacity of holograms to be copied also by a photographic or contact-printing process, thereby permitting the inexpensive production of copies in a very limited number. This attribute is important within the marketplace, where consumer demand for certain audio-visual programs involving, for instance, the performing arts might be insufficient to warrant the expense of preparing for production of copies via the high-volume process described above. Thus, the diverse needs and tastes of the public can be better served by holographic information storage devices than by other optical systems.

Prior-art holographic devices which warrant comparison with the present invention are as follows:

Takeda et al, U.S. Pat. No. 4,021,606, describes a device which employs oblong Fourier-transform holograms for purpose of reducing motional sensitivity. It differs significantly from the present invention in that the signal images (as opposed to the holograms themselves) are elongated in a direction parallel to the movement of the data carrier. Also, neither the signal images nor the separate holograms overlap. Only audio information is stored in holographic form upon the rotating disc, video information being recorded adjacent to the audio track; neither is the device intended to serve as a computer-data storage device.

Satoh et al, U.S. Pat. No. 4,104,489, also relies upon Fourier-transform holograms. And, like the previous patent, the signal images occur in a specific plane relative to the hologram recording. Tracking of the signal image path is accomplished using a servo-feedback system in conjunction with a differential photodetection system, this apparatus being employed during lateral movement of the turntable (the signal detection system being stationary).

Four patents describe devices employing superimposed holograms (or superimposed diffraction gratings), a primary feature of the present invention. Lamberts et al, U.S. Pat. No. 3,392,400, describes a device employing superimposed sets of equally-spaced diffraction lines, each set representing one digit; the device does not use holographic techniques for creating these diffraction lines, nor does the device permit the superimposition of adjacent data tracks. Brooks, U.S. Pat. No. 3,812,496 describes a device which uses holographic techniques for recording superimposed data tracks on a moving strip of film, but does not employ coded reference beam multiplexing (as does the present invention); nor does the device permit the non-simultaneous recording of adjacent data tracks during multiple exposures of the same photosensitive surface of the recorded medium. Silverman, U.S. Pat. No. 3,753,249, describes a device which records "spot patterns" elongated in a direction parallel to the motion of the rotating data carrier, these patterns substantially overlap one another; the device does not use overlapping adjacent data tracks, nor does the signal detection apparatus resemble that which is employed in the present invention. Marko, U.S. Pat. No. 3,848,096, describes a device which sequentially superimposes an entire aggregate of data on top of the same photosensitive material; unlike the present invention no area of the photosensitive material is masked during the exposure process and, therefore, no limits are set on the number of exposures to which the photosensitive material is subjected; the data carrier remains stationary during recording and playback, and a servo-feedback system is employed to accurately follow the data track. This last invention does not describe a device which addresses the problem that diffraction efficiency of a hologram is reduced by the square of the number of superimposed exposures, as is well known in the art.

In addition to the previously mentioned Brooks and Satoh patents Kamisaka et al, U.S. Pat. No. 3,903,360, describes a device which employs a differential photodetection system for the purpose of separating a time-varying signal from a simultaneously recorded carrier frequency. Unlike the Brooks, Satoh and Kamisaka devices the present invention uses a differential photodetection system for the purpose of extracting noise from the data signal, this noise being the consequence of using coded reference beam multiplexing during the recording process.

Among prior-art devices employing a rotating disc as the data carrier Kiemle, U.S. Pat. No. 3,770,886, employs a needle to track a spirally inscribed groove on the disc. Of particular significance is the fact that off-axis holography is employed to record video information either at the base of the groove or adjacent to it. Unlike the present invention, however, the holograms employed in the Kiemle device are recorded in one dimension only, this dimension being in the direction of movement of the recorded medium. No overlap of adjacent tracks is employed, nor is there any attempt to record both audio and video information holographically, the former being recorded as undulations in the groove itself as with conventional LP records. Broussaud et al, U.S. Pat. No. 3,842,197, describes a flexible disc upon which have been recorded a "mosaic" of holograms in spiral form, and for track-guiding purposes a second set of holograms has been superimposed upon a first set during a two-stage recording process. Unlike the present invention the two separate sets of holograms are not multiplexed through a coded reference beam procedure, nor is there substantial overlapping of holograms in circumferential and radial directions (although the possibility of "slight overlapping" is referred to in the discussion of the preferred embodiments—see column 2, line 32). Rembault, U.S. Pat. No. 4,025,731, also employs a holographically-recorded disc, but this disc does not include holograms which overlap in both circumferential and radial directions, nor does the recording process employed to create such a disc include the nonsimultaneous multiplexing of signal images.

SUMMARY OF THE INVENTION

An object of this invention is to provide a holographic apparatus which is capable of serving equally well as an audio and video playback mechanism, and as a read-only block-access computer data storage mechanism with primary application in the small "home computer" system.

Another object of this invention is to provide a holographic apparatus which permits continuous playback of multi-channel audio data and video data, allows for stopframe, picture reversal and slow-motion effects during playback of video data, and also permits rapid access to any block of data when the same apparatus is employed as a block-access read-only data storage system for a computer.

A further object of this invention is to provide a low cost holographic system which can employ signals in either digital or analog form, or both forms simultaneously.

A still further object of this invention is to provide a holographic system wherein alignment between the signal and the signal detection means is not critical, and the method by which this goal is accomplished affords the opportunity to maximize data storage density as well as to provide uniform utilization of the storage medium.

The foregoing and other objects and advantages of the invention will be apparent from the following more detailed description of preferred embodiments of the invention, as illustrated in the accompanying drawings.

BRIEF DESCRIPTION OF THE DRAWINGS

FIG. 3 depicts the locations of various holograms arranged according to a spiral path on a rotating data carrier.

FIG. 4 is a side view of a rotating photodetection system.

FIG. 5 is an overhead view of a rotating photodetection system.

FIG. 6 is an overhead view of an alternate form of rotating photodetection system.

FIGS. 16A and B depict hologram overlap occurring at the outermost and innermost areas respectively on a rotating data carrier.

FIG. 17 depicts an array of paired photoreceptors employed to detect signal images whose dimensions approach point sources of light.

FIG. 18 depicts a playback apparatus employing an array of paired photoreceptors to detect data stored on a reflective rotating data carrier.

DISCUSSION OF THE PREFERRED EMBODIMENTS

Figure 1:
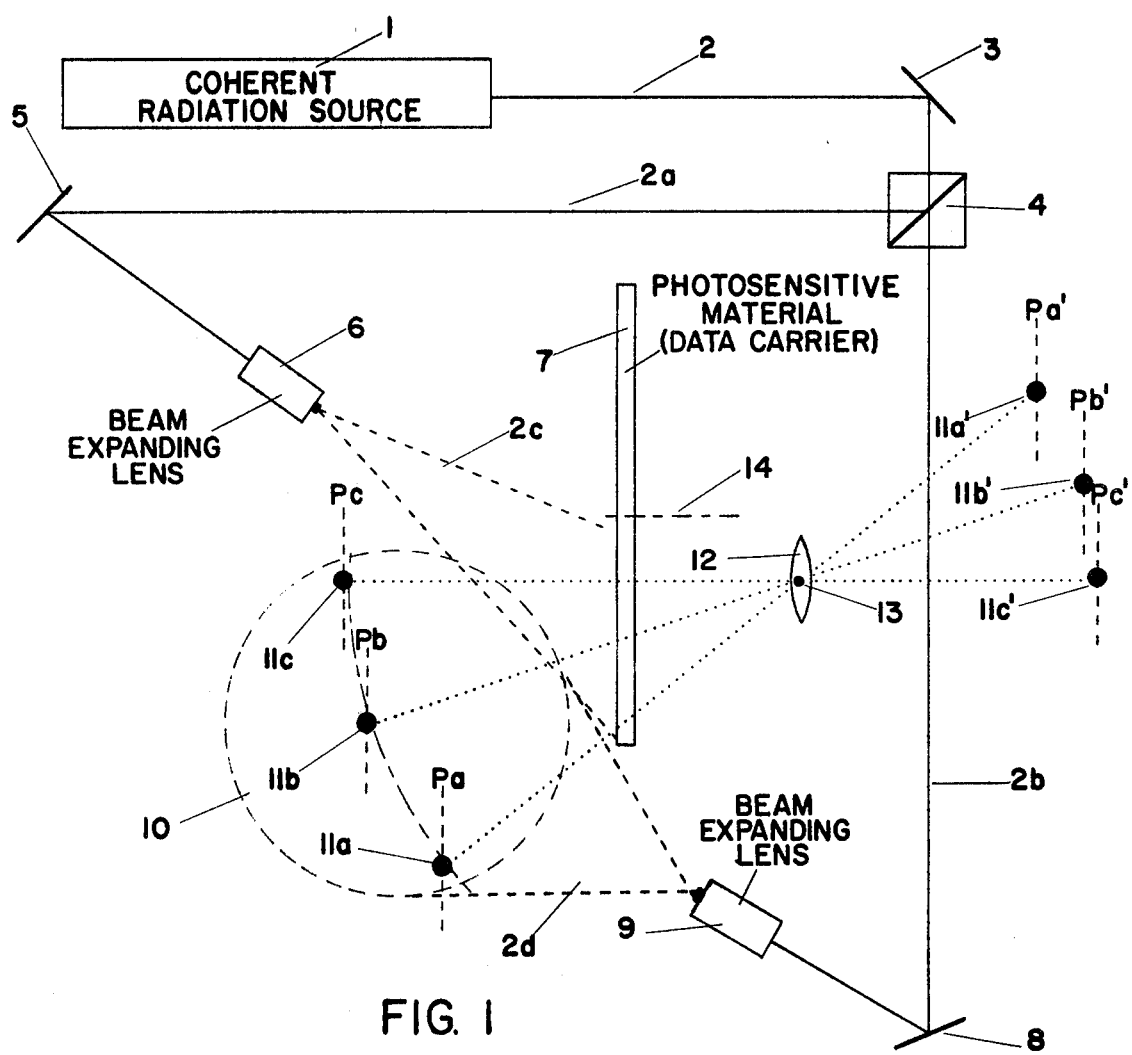
FIG. 1 depicts a hologram-forming geometry.

Understanding of the principals of this invention can best be gained by reviewing briefly certain features of off-axis holography. Referring to FIG. 1 we observe a coherent radiation source 1 emitting, for instance, a beam of coherent light 2 which is reflected from mirror 3 toward beam splitter 4 where the beam is divided into two beams 2a and 2b. Beam 2a is reflected toward mirror 5 where it is reflected toward beam expanding lens 6. Beam 2a is expanded into a cone of light 2c (the "reference beam") which impinges upon photosensitive material 7. Beam 2b is reflected from mirror 8 toward beam expanding lens 9 which expands the beam into another cone of light 2d (the "object beam"). Any reflective object lying within an area called the coherence volume 10 will reflect light from 2d toward the photosensitive material 7 where this light interferes with light from 2c, forming an interference pattern within the photosensitive material 7 which, upon later illumination with an expanded beam of light identical to 2c, will reconstruct a virtual image identical in amplitude and phase to the original object. Objects 11a, 11b and 11c will be visible upon reconstruction as virtual images in planes Pa, Pb and Pc, these planes being parallel to the plane of photosensitive material 7. Since the spatial relationships of these virtual images are recorded on the hologram, lens system 12, pivoting about point 13, can bring to focus real images 11a', 11b' and 11c' in planes Pa', Pb' and Pc' respectively, these planes also being parallel to the plane of 7. Objects 11a, 11b and 11c were positioned within the coherence volume such that they were all equidistant from pivot point 13 and, therefore, real images 11a', 11b' and 11c' will also be equidistant from pivot point 13.

If the expanded beam of light which illuminates the hologram during reconstruction (the "reconstruction beam") does not originate from the same location as did the reference beam the positions of the virtual images of objects 11a, 11b and 11c will not duplicate the original positions occupied by these objects within the coherence volume during hologram formation. Likewise, if the beam-expanding lens which is employed during hologram reconstruction does not match the focal length of the beam-expanding lens 6 employed during creation of the hologram the virtual images of objects 11a, 11b and 11c will similarly be altered relative to the original positions of these objects. This particular feature of holography will be treated at greater length during the discussion of coded reference beam multiplexing.

The images of objects 11a, 11b and 11c can be recorded separately during multiple exposures of the photosensitive material. Moreover, the same object may be employed during each of these exposures if this object is moved between exposures along an arc (dash-dot line) whose center is 13. Different areas of 7 can be illuminated during these separate exposures by rotating 7 about axis 14 and by positioning a movable mask (not shown), provided with a small aperture, between the object and 7.

To facilitate the creation of a holographic data carrier which contains an arcuate image path as depicted in FIG. 1 a recording process is employed which includes features discussed with reference to FIG. 2. Here, in a side view of the hologram-forming geometry depicted in FIG. 1, we observe photosensitive material 7 rotating about axis 14. Object 11 is connected by support 16 to arm 17 which passes beneath 7 and pivots about axis 13 (vertical dash-dot line). A mask 15 blocks all but a small portion of 7. As 7 is rotated about axis 14 during successive exposures the aperture in the mask 15 is slowly moved from the perimeter of 7 toward the center of 7 along a line perpendicular to axis 14 and parallel to the plane described by arm 17 pivoting about axis 13. The pivoting of arm 17 and the movement of mask 15 is coordinated so that object 11 occupies plane Pa when the aperture of mask 15 is at the perimeter of 7, and occupies plane Pc when the aperture of mask 15 is close to the center of 7. These planes (and interim plane Pb) are all parallel to the plane of 7 as depicted in both FIG. 1 and FIG. 2. Movement of object 11 in the dash-dot arc of FIG. 1, and movement of mask 15 as previously described, results in a series of holograms recorded upon photosensitive material 7 in the form of a spiral trace 18 as depicted in FIG. 3. Hologram 19a will form a virtual image of 11a (as previously shown in FIG. 1), hologram 19b will form a virtual image of 11b, and hologram 19c will form a virtual image of 11c. Holograms 19a, 19b and 19c all occur along one radial 20 of photosensitive material 7 (sometimes referred to hereinafter as the "data carrier"). FIG. 3 does not depict the actual size or configuration of the holograms as they would occur on a rotating data carrier, nor does it depict the overlapping of consecutive holograms and the overlapping of adjacent hologram tracks, as will be explained later. It does serve to show that in the preferred embodiment the radial 20 is straight, and if projected radially inwardly, would intersect axis 14.

It must be understood that the recording process briefly described above does not limit this process to the use of a reflective object or a support and arm mechanism as described with reference to FIG. 1 and FIG. 2; the "object" employed in the recording of data upon a master data carrier can be any fluctuating coherent radiation source which emits an object beam from the site of object 11 in FIG. 1 and FIG. 2, such fluctuation occuring in accordance with a fluctuating electrical signal representing the data being recorded. This object beam could be conducted from a coherent radiation source, common to both the object beam and the reference beam, to the site of object 11 in FIG. 1 and FIG. 2 via one or more fiber optic cables (not shown), for instance. Also, the means by which the object beam source is moved in an arcuate path, whose center is axis 13 in FIG. 1 and FIG. 2, can be any mechanism which accomplishes this purpose. The common radiation source is pulsed at a frequency commensurate with the quantity of data to be recorded during a given quantity of time using a pulse-width and amplitude which is appropriate for hologram formation, as is well known in the art. The manner in which the object beam fluctuation is effected and other unique features of this recording process will be presented during the ensuing discussion.

Figure 2:
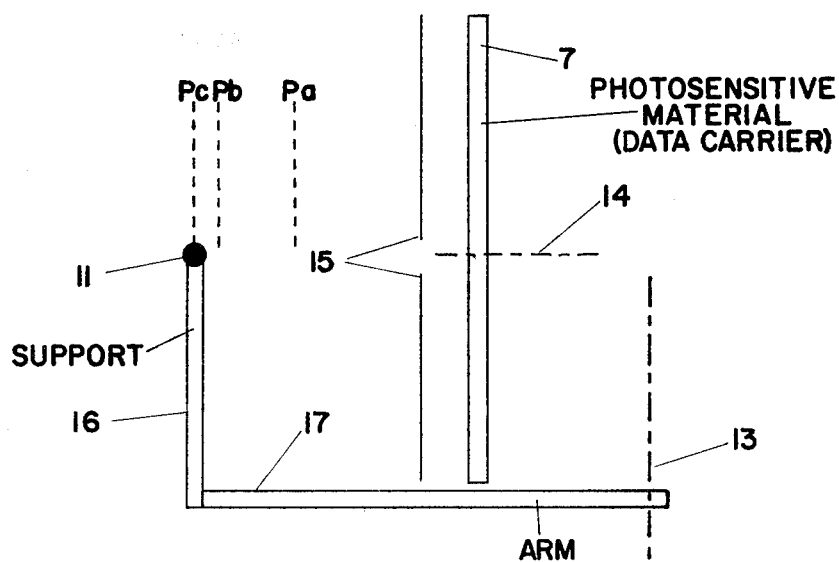
FIG. 2 depicts a side view of the same hologram-forming geometry.

A novel feature of this invention is that of forming an arcuate signal image path during the recording process, as described above with reference to the geometry depicted in FIG. 1 and FIG. 2. This results in a recording which is highly advantageous because it can be played back without the need for translatory motion of a signal detector. A scanning system for playback is depicted in FIG. 4 wherein alignment between a photodetector and a virtual signal image 11 is accomplished by rotary motion only. Mirror 21, lens system 12 and photodetector 22 are contained within a cylindrical enclosure 23, forming a photodetection system which rotates about axis 13. To move the complete photodetection system from a position in which real image 11a' is detected to a position in which real image 11c' is detected (these images appearing in FIG. 4 as 11') requires only rotary movement of the photodetection system through, for instance, 40 degrees as depicted in FIG. 5, which is a top view of the apparatus appearing in FIG. 4. Comparing FIG. 5 with FIG. 1 we observe that photodetector 22 is positioned directly above the location of pivot point 13. Since lines a-a', b-b' and c-c' (FIG. 1) are of equal length, real images 11a', 11b' and 11c' will all be focused at photodetector 22 even though virtual images 11a, 11b and 11c all occupy planes Pa, Pb and Pc parallel to, but unequal in distance from the data carrier 7 rotating about axis 14. Likewise, real images 11a', 11b' and 11c' (all appearing as 11' in FIG. 5) all come to focus at photodetector 22 even though the distances between mirror 21 (FIG. 4) and holograms 19a, 19b and 19c (FIG. 5) upon the data carrier vary as the photodetection system contained within rotating cylindrical enclosure 23 rotates about pivot point 13.

The advantage of employing only rotary motion to align a specific signal image path with the signal detector, as depicted in FIG. 4 and FIG. 5, is that selection of any hologram track located upon a rotating data carrier can be extremely fast. Such rotary motion of the signal detection apparatus is made possible by the arcuate path described by the object beam source during the recording process. A conventional LP record employing a stylus at the end of a tone arm requires movement of the tone arm through a considerable distance in order to align the stylus with a specific groove upon the record. Similarily, magnetic disc memory devices, optical playback systems which focus a read-beam of light upon a rotating disc, and holographic data storage systems in which signal images are equidistant from the plane of a rotating data carrier all require movement of the signal detector across the surface or parallel to the surface of the rotating data carrier. Such large amounts of signal detector movement inevitably compromise the speed with which signal tracks upon the carrier can be accessed.

A somewhat different means for quickly accessing any track on the rotating data carrier is depicted in FIG. 6, wherein a mirror 21 (or a right-angle prism), rotatable about axis 13, directs light rays from, for instance, virtual image 11c through lens system 12 toward photodetector 22 where real image 11' appears. Light rays from virtual images 11a or 11b can also be accessed by rotating mirror 21 about axis 13, all of these images being formed by holograms 19a, 19b and 19c, for instance, located on data carrier 7 rotating about axis 14. The advantage of this embodiment is that the lens system 12 and the photodetector 22 remain stationary, the only moving part of the photodetection system being mirror 21. A possible disadvantage to this configuration is the requirement for mirror 21 to be in precise alignment relative to photodetector 22 throughout its rotary motion about axis 13, whereas the embodiment as depicted in FIG. 4 offers permanent alignment between all parts of the photodetection system. Both embodiments require a means by which rotary movement is imparted to the appropriate elements. Such rotary movement can be supplied by way of a stepping motor as will be discussed later with reference to a rotating photodetection system as depicted in FIG. 4 but equally applicable to the embodiment just described.

Another matter of importance concerns the tracking of a signal path. A conventional phonograph record, with its information embedded in a groove, has a natural means of keeping the signal detector orientated with the proper track, and some optical data storage systems also employ a groove in the surface of the carrier for the same reason. However, an optical playback system which is intended for rapid, random access to any block of data on the carrier cannot employ a tracking groove. Instead, a means must be employed either to detect the correct signal image path and keep it centered with respect to the signal detector, or to relax tolerances of misalignment between the signal image path and the signal detector. The latter solution may involve the widening of both a hologram track and the signal image path which this track generates upon illumination with a reconstruction beam. But, if this is the chosen solution, one must deal with the tradeoff which exists between maximizing data-packing density and widening the hologram tracks and their associated signal image paths sufficiently to achieve significant relaxation of tracking-error tolerances.

Figure 7:
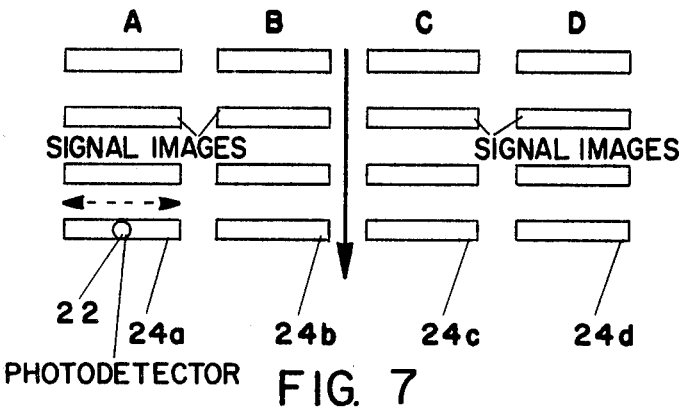
FIG. 7 depicts adjacent paths of elongated signal images formed with conventional means.
Figure 8:
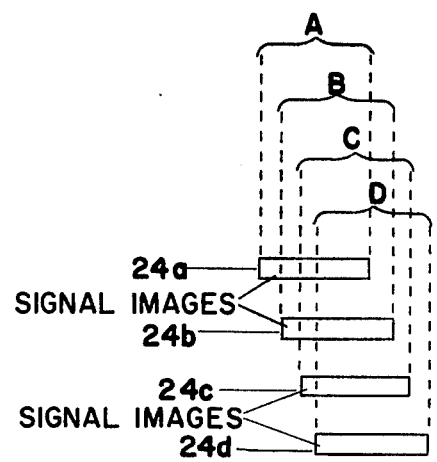
FIG. 8 depicts the overlapping of adjacent signal images formed with multiplexed means.

The holographic technique of spatially modulating the reference beam during hologram formation ("coded reference beam multiplexing") provides a novel and advantageous method for achieving high tolerance of signal image misalignment without unduly compromising total data storage capacity of the carrier. FIG. 7 depicts a small portion of four separate and adjacent signal image paths A, B, C, D containing signal images 24a, 24b, 24c and 24d respectively. Each signal image in FIG. 7 and subsequent drawings is generated during playback of the data carrier (not shown) by illumination of the specific hologram associated with that signal image. Thus, the four signal images in path A of FIG. 7 are generated by the sequential illumination of four consecutive holograms during rotation of the data carrier. The signal images in FIG. 7 are elongated in a direction (dotted arrow) parallel to a corresponding radial of the rotating data carrier. A photodetection element 22 has been drawn superimposed upon one of the signal images 24a to indicate the extent to which lateral misalignment can be tolerated (length of dotted arrow) during movement of the signal images past the photodetection element as the data carrier rotates in a direction indicated by the solid arrow. Carried to extreme, this elongation of the signal images would severely restrict the total number of adjacent paths stored upon a rotating data carrier if conventional photographic methods were used to record the signal images on the surface of a photosensitive material. Holography permits not only the placement of the apparent location of the signal images behind the carrier surface and occupying different planes within the coherence volume (as detailed in FIGS. 1-5), but also permits the substantial overlapping of adjacent signal image paths, each of which were recorded during one revolution of the data carrier. FIG. 8 depicts the same four signal image paths A, B, C, D as in FIG. 7, but these four paths now overlap to such an extent as to make the total amount of data forfeited (due to elongation of the signal images) negligible. The separate signal images 24a, 24b, 24c and 24d have been drawn as though they do not lie on top of one another, but this is for the sake of clarity only; many signal images, occuring along a line substantially parallel to any given radial of the data carrier, would indeed lie on top of one another within the coherence volume of the holograms comprising an actual recording. If the signal images are sufficiently elongated in a direction substantially perpendicular to the signal image path, movement of the photodetection system is required only on a periodic basis. That is, a transition from one signal image path to an adjacent path (as "seen" by the photodetection system) during one revolution of the rotating data carrier is effected by the means employed to distinguish between overlapping adjacent signal images, and movement of the photodetection system is necessary only when the limit of toleration of lateral misalignment between overlapping signal images and the photodetector is reached. The method by which these overlapping signal images are encoded and decoded such that only one is rendered visible to the photodetection system at a given instant will now be discussed.

Figure 9:
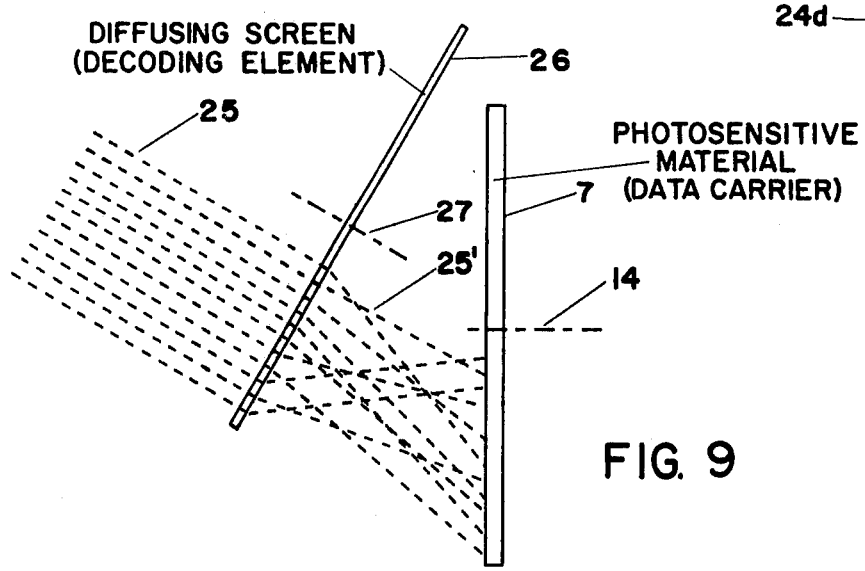
FIG. 9 depicts the spatial modulation of reference beam rays.

Coded reference beam multiplexing is well known in the art (see Robert J. Collier, Christoph B. Burckhardt and Lawrence H. Lin, *Optical Holography* (New York: Academic Press, 1971) pp. 409-414.), and consists of spatially modulating the bundle of rays comprising the reference beam during hologram formation by passing these rays through a material which causes the separate rays to bend in numerous directions while retaining the bundle's general direction toward the photosensitive medium. This spatial modulation of the individual rays within the reference wave bundle, which then interferes with the object beam, results in an interference pattern on the photosensitive medium that is unique to a specific exposure. Other exposures of the same area on the photosensitive medium, using different positions of the encoding material, result in dissimilar interference patterns superimposed upon the first one. Each interference pattern will reconstruct the one clear image associated with that pattern, but only if the encoded bundle of the reconstruction beam matches exactly the encoded bundle of the reference beam employed during hologram formation; all other superimposed, but uncorrelated interference patterns will generate image-plane noise which surrounds and is embedded within the desired image. A common material used for encoding purposes is a ground-glass diffusing screen as depicted in FIG. 9, wherein we see a bundle of parallel rays 25 passing through a diffusing screen 26, then traveling to data carrier 7 as a bundle of spatially modulated rays 25'. For purposes of moving ground-glass diffusing screen 26 into different positions, it is allowed to rotate about axis 27 (dash-dot line). As is well known in the art there exists an extremely low tolerance of misalignment between the ground-glass diffusing screen and the hologram during reconstruction of a specific encoded image. A more suitable material for encoding the reference beam might be a substantially flat piece of translucent material with one surface comprised of a plurality of small lenslets of varying focal length. Or, this surface might consist of an efficient hologram or a kinoform (for discussion of the kinoform, see Collier, *Optical Holography*, pp. 560-563.). Regardless of the manner in which the reference beam or reconstruction beam is encoded, allowance must be made for the occurance of small discrepancies between the encoding material (element 26 in FIG. 9) and the data carrier, and only a substantial translation of the encoding material will result in a completely different set of encoded rays occuring within the encoded reference beam or reconstruction beam. Whatever material is chosen for encoding purposes (when used in a playback apparatus this material will be referred to hereinafter as a "decoding element") will not cause undesired signal images to appear as uncorrelated and diffuse noise within the plane of the desired virtual signal image, as was the case with a ground-glass diffusing screen, but will instead cause these extraneous signal images to appear as multiple virtual images of low amplitude scattered throughout the coherence volume and occupying numerous planes parallel to the surface of the rotating data carrier. However, the lens system employed for purposes of focusing the desired signal image upon a photodetection element will cause a blurring of these extraneous images because they do not reside at the proper focal length from the lens system. Thus, a scattering of the uncorrelated signal image noise into a diffuse background occurs at the site of the photodetector, this being advantageous from the standpoint of extracting the noise from the signal as will be discussed next.

Figure 10:
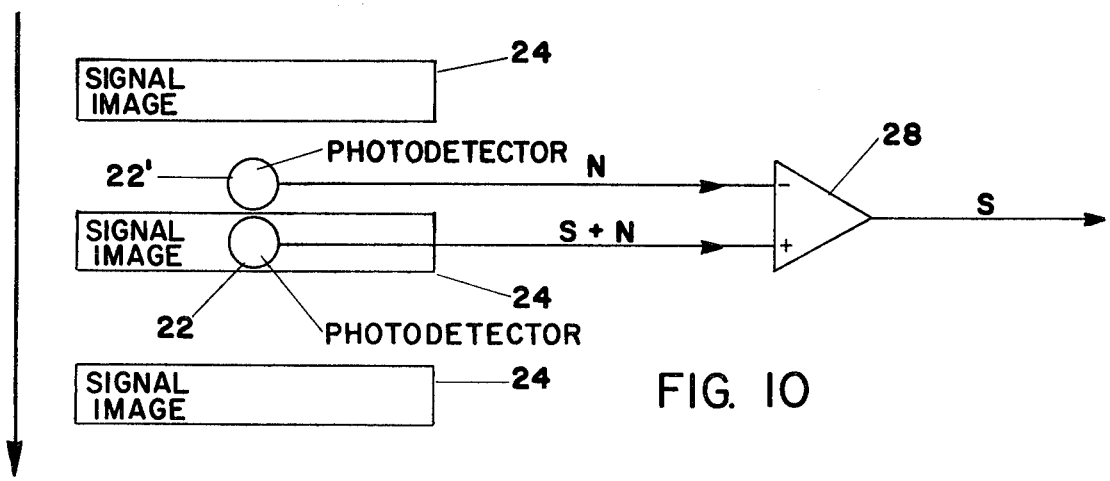
FIG. 10 depicts the function of a differentially-operating pair of photoreceptors.

Another novel feature of this invention is the manner in which a signal is separated from the noise inevitably resulting from coded reference beam multiplexing of adjacent signal image paths. In FIG. 10 we observe a series of elongated signal images 24 moving in the direction of the arrow, and these images are focused by a lens system (not shown) onto two photodetection elements 22, 22' which are connected to the inputs of a differential amplifier 28. As positioned in FIG. 10 element 22 detects a signal image 24 plus embedded noise, and element 22' detects the diffuse coded reference beam noise (not shown) which occurs in the space between each of the signal images. The differential amplifier 28 converts the current generated by photodetection into voltage, and since the polarity of the voltage associated with 22' is opposite to that of 22, the differential output voltage of 28 represents the instantaneous difference which exists between the amplitude of one of the signal images and the amplitude of the surrounding noise. This process may be described thusly: $(S+N)+(-N)=S$.

Figure 11:
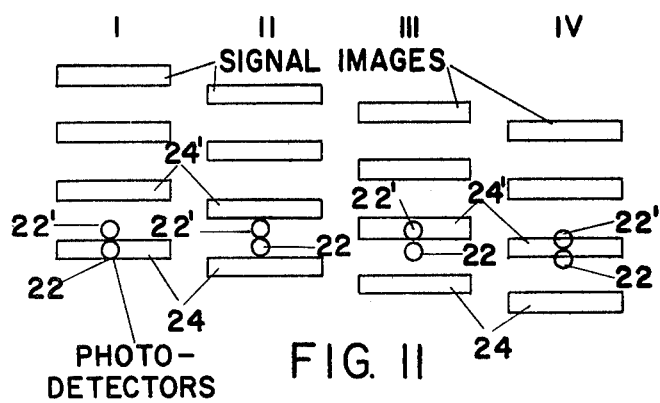
FIG. 11 depicts the movement of signal images past a differentially-operating pair of photoreceptors.
Figure 12:
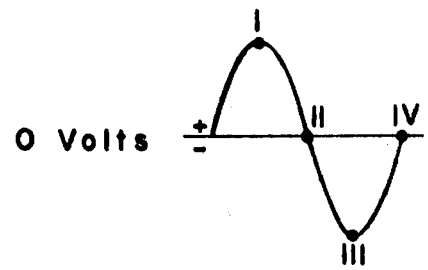
FIG. 12 depicts the fluctuating voltages obtained from the photoreceptors depicted in FIG. 11.

As further explanation FIG. 11 depicts the movement of signal images past the stationary photodetection elements of a differential photodetection system, and FIG. 12 depicts the fluctuating output voltage obtained from such a system. In column I of FIG. 11 one signal image 24 is positioned directly over photodetection element 22, while uncorrelated noise (not shown) occupying the spaces between the signal images is detected by element 22'. As discussed previously, action of the differential photodetection system extracts the uncorrelated noise which is embedded within the signal image 24, resulting in voltage level I depicted in FIG. 12. In column II of FIG. 11 element 22 and 22' are each receiving relatively equal amounts of radiation from the uncorrelated noise occuring between signal images 24 and 24', resulting in voltage level II in FIG. 12. Columns III and IV of FIG. 11 depict further advancement of the signal images past the photodetection elements, resulting in voltage levels III and IV in FIG. 12. A Schmitt trigger can subsequently convert the fluctuating voltage depicted in FIG. 12 to pulse waves of varying width, the additional circuitry can be employed to control the amplitude of these pulse waves according to the amplitude of the recorded signal images, as is well known in the art. The leading edge of such pulse waves may serve as timing pulses.

The differential photodetection system as described above not only extracts the signal from the surrounding uncorrelated noise, but also provides a solution to two problems inherent with holography. The first problem is that of diffraction grating efficiency as it relates to the angle between object beam and reference beam during hologram formation. Since this invention employs a signal source which moves in an arc through the coherence volume (as depicted in FIGS. 1–5) the angle between the object beam and the mean direction of the coded reference beam is larger for holograms formed at the perimeter of the rotating data carrier than is the case for holograms formed closer to the center of the data carrier. Thus, diffraction efficiency is nonuniform across the surface of the data carrier, and will result in nonuniform image intensities. However, the diffraction grating efficiency within any given area on the data carrier also affects the intensity of the surrounding uncorrelated noise generated by the coded reference beam multiplexing procedure. Since the differential photodetection system is effectively measuring the ratio between the amplitude of the signal image and the amplitude of the surrounding noise, it automatically compensates for differences of diffraction grating efficiency.

The second problem involves the nonuniformity of photosensitive emulsions and nonuniform shrinkage of emulsions during development. These, and other anomolies associated with the processing of holograms result in wide variations of diffraction grating efficiency from one area of a composite hologram to another. As before, the differential photodetection system incorporated into this invention automatically compensates for these variations in diffraction grating efficiency for the same reason as stated above. Additionally, potential nonlinearities of radiation transmittance through a translucent turntable (or nonlinearities of radiation reflectance from a reflective data carrier as employed in one embodiment of this invention), and nonlinearities due to varying distances between the data carrier and the photodetection elements, will not degrade the linearity of signal amplitude detection to an appreciable amount. That is, any attenuation of the amplitude of the reconstruction beam during playback, for whatever reason, will affect equally the signal and the surrounding uncorrelated noise; the differential photodetection system compensates for such nonlinearities.

Another novel feature of this invention pertains to the exploitation of the elongated signal image shape. Maximum data-packing density upon a given area of the data medium would be obtained by restricting each multiplexed signal image to a single point source of light; the necessity for elongation of this signal image for purposes of reducing misalignment sensitivity inevitably compromises the total data-packing density. However, the elongated signal image, in conjunction with a dual differential photodetection system, affords the opportunity for using the angular position (azimuth) of the signal image as a data conveyance, thereby limiting the data-packing density compromise to a tolerable amount.

Figure 13:
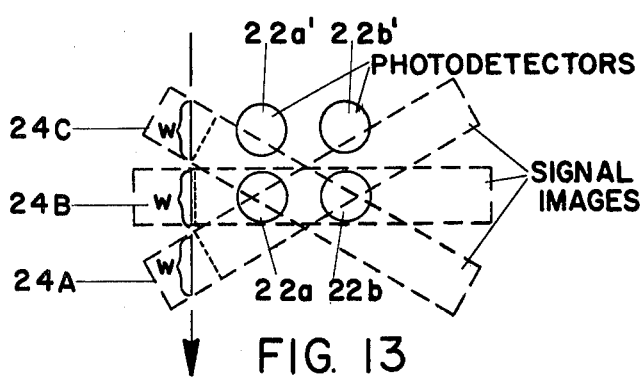
FIG. 13 depicts three azimuth positions of a signal image.
Figure 14:
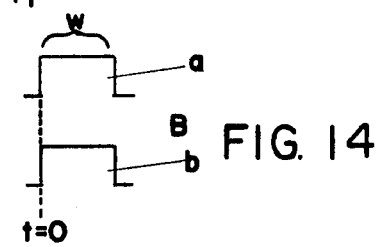
FIG. 14 depicts the fluctuating voltages obtained from detection of the azimuth positions of the signal image depicted in FIG. 13.

FIG. 13 depicts three possible positions A, B, C of one elongated signal image 24 moving in the direction of the dashed arrow. Also depicted are two pairs of photodetector elements 22a and 22a', 22b and 22b', each pair operating differentially as already discussed. Each differential photodetector pair is connected to a Schmitt trigger (not shown) where zero crossing points of voltage are converted to clearly defined pulses, after which the pulses coming from each pair are compared as to their respective times. In so doing the azimuth of each signal image may be determined, even if the signal image has strayed considerably from an exact dead-center position with respect to the dual differential photodetection elements. FIG. 14 represents the timing pulses and pulse widths as obtained from each of the three angular positions A, B, C of the signal image 24. Comparing FIG. 13 and FIG. 14, in A we observe the leading edge of the pulse "a" from differential photodetector pair 22a–22a' preceding the pulse "b" from differential photodetector pair 22b–22b' by an amount +t, representing the azimuth of signal image 24A. In B we observe that t is equal to zero, representing no angular deviation of the signal image 24B from a horizontal azimuth. In C we observe an amount −t, representing the azimuth of signal image 24C.

The dual differential photodetection system is also capable of determining the signal image width even when the signal images occupy relatively extreme angular positions. After determining the angular position of each signal image and storing this information in the buffer memory of a dedicated microprocessor, the width of the signal image (dotted lines in FIG. 13) is calculated, using the pulse width "w" as received by the dual differential photodetection system and represented by those positions of the dashed line enclosed by brackets in FIG. 13.

Since the differential photodetection system compensates for differences of diffraction efficiency existing on the rotating data carrier as already discussed, it becomes feasible to use signal image amplitude as a data conveyance. Image amplitude could vary either in discrete steps (digital) or be infinitely variable between a low and high limit (analog). Of course, all three means of data conveyance (i.e. image azimuth, image width, image amplitude) can be used simultaneously, thereby obtaining parallel data capability and/or lowering the limit of minimum rotational speed of the data carrier.

Varying the distance between separate signal images may also be employed as a data conveyance, this distance either changing between two discrete amounts representing binary "ones" and "zeroes" (frequency-shift keying), or varying about a center frequency (modulation of the spatial frequency). A problem is encountered, however, when one attempts to employ a variable pulse-rate of the coherent radiation source as a means for manipulating the distance between signal images; maintaining a constant amplitude of the output of the coherent radiation source during the recording process becomes difficult. If the coherent radiation source is a pulsed laser beam, and if the pulsing of such a beam is accomplished by the technique of cavity-dumping a continuous-wave laser, then the amplitude of each pulse is dependent, in part, upon the amount of time between successive pulses as is well known in the art. Therefore, changing the pulse-rate in order to achieve varying distances between each of the signal images during the recording process would result in unequal amounts of light amplitude during successive exposures of the photosensitive medium. Unless compensation is made for this source of nonlinearity the use of signal image amplitude as a data conveyance would be precluded.

Figure 15A:
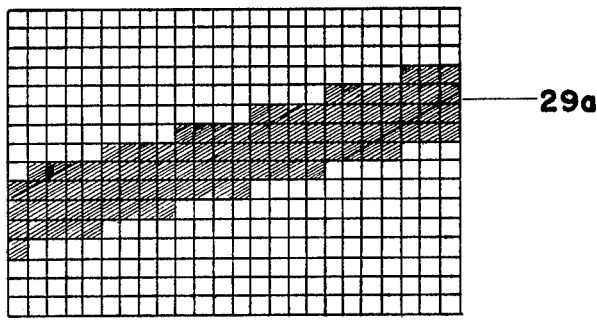
FIGS. 15A, B and C depict a nonmotional means of controlling signal image width, amplitude, azimuth and spatial frequency during hologram formation.
Figure 15B:
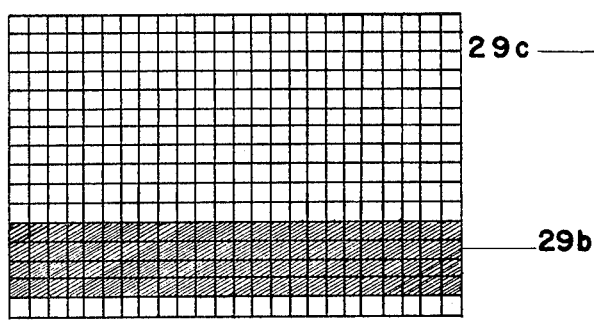
Figure 15C:
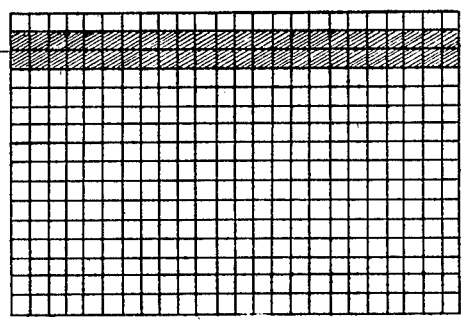

A means for recording signal images which vary in azimuth, width, amplitude and spatial frequency, using a coherent radiation source with a constant pulse rate, may take the form of a Pockels cell matrix which serves as a controllable object beam source. Such a matrix, the frontal area of which is depicted in FIG. 15A, FIG. 15B and FIG. 15C occupies a position at the top of support 16 and is concurrent with object 11 in FIG. 2, and moves in an arcuate path during the recording of a data carrier as previously described. Fiber optic cables (not shown) or other optical means would deliver coherent radiation to the back of the matrix from a pulsed coherent radiation source. By activating each separate and addressable cell according to data supplied to the matrix during the recording process the polarization of each cell is rotated by an amount proportional to the voltage supplied to that cell; a polarization analyzer (not shown in FIG. 2) interposed between the matrix and the rotating photosensitive medium completes the signal modulation system according to well-known means in the prior art. In FIG. 15A we see a group 29a of activated cells (shaded area) occuring within the entire Pockels cell matrix. These activated cells, in conjunction with the polarization analyzer, would permit the passage of pulsed coherent radiation from the back of the matrix toward the photosensitive medium, thereby causing a signal image to be recorded upon the photosensitive medium in the form of a hologram, as previously discussed. Furthermore, the amplitude of this recorded signal image is determined by the degree of transmittance of the group of activated cells within the matrix, this transmittance being controlled by the polarization of each cell relative to the polarization analyzer. The azimuth and width of each recorded signal image is controllable, the total number of cells comprising the matrix being much larger than depicted in FIG. 15A, FIG. 15B and FIG. 15C; photolithographic means of fabrication would permit each cell to be of very small area. Spatial frequency modulation of signal images is effected, without resorting to a variable pulse-rate of the coherent radiation source, by altering the location of the activated cells within the matrix. FIG. 15B shows the Pockels cell matrix with a group of activated cells 29b four cells in width near the bottom of the matrix, whereas FIG. 15C shows the same matrix during a subsequent exposure with a group of activated cells two cells in width at the top of the matrix. The holograms formed upon the rotating data carrier during these exposures will generate, upon illumination with a properly encoded reconstruction beam during playback, signal images which have the same size, azimuth, amplitude and location as the groups of activated Pockels cells. Other means for effecting the formation of signal images are possible, and the scope of this invention is not limited to the use of a Pockels cell matrix as described above; it is cited for example only.

Regardless of the means chosen for creating recorded signal images, a transformation of audio, video and computer data into a fluctuating object beam source must be made by converting such data into electrical signals of either a digital or analog nature. The fluctuations of signal image amplitude, width, azimuth and spatial frequency can each represent a sequence of instantaneous values of one or more analog signals, the pulsing of a coherent radiation source during hologram formation causing a sampling of such signals according to well-known sampling theory. Or, data which is already in digital form may be used to control, for instance, the Pockels cell matrix previously described, thereby creating signal images which fluctuate in discrete steps according to any one of various multi-state logic formats.

The accurate detection of signal image spatial frequency requires the maintenance of substantially parallel signal images; abrupt changes in signal image azimuth would compromise the ability to utilize spatial frequency modulation as a means of recording data. This problem can be minimized by restricting the use of signal image azimuth to those frequencies which occur in the lower end of the frequency spectrum represented on the data carrier.

By assigning one channel of information to each of the signal image data conveyances (amplitude, width, azimuth and spatial frequency) multi-channel audio recordings and color-video recordings, requiring luminance, color and audio information, may be produced which would be virtually free of cross-talk and intermodulation distortion. Of course, well-known techniques of combining two signals on a common carrier (such as frequency-division multiplexing) may be employed to increase even further the amount of information contained within each of the signal image data conveyances, these techniques being especially appropriate for signals within the audio-frequency spectrum.

Still another feature of this invention pertains to the means by which data is stored so as to compensate for the differences in track length per revolution which occur at the outer portions of the rotating data carrier as compared to the track length at the inner portions of the carrier. Assuming that signal images are holographically recorded in the well-known manner of pulsing coherent radiation at an appropriate sampling rate using an intra-cavity acousto-optic modulator, the distance between signal images is a function of both pulse rate and rotational speed of the data carrier. If these two combined factors are chosen so as to provide an ample separation of the signal images during playback of the innermost portion of the spiral track or innermost concentric track (i.e. sufficient space between signal images to sample uncorrelated noise), the remaining concern is the number of exposures to which a given area on the data carrier is subjected. There is a finite limit to the number of multiplexed holograms (i.e. separate exposures) which can be overlayed on the same photosensitive surface; diffraction efficiency is reduced by the square of the number of exposures. This limiting factor governs the number of overlapping holograms which can occupy any given area on the data carrier, and the total number of such holograms is the product of those holograms which overlap in the direction of track movement as the data carrier revolves and those holograms which overlap in a direction perpendicular to track movement due to multiplexing of adjacent tracks. During the recording process, if the unmasked area of the rotating data carrier is of a size which limits the amount of overlap of consecutive exposures to, for instance, one hologram at the outermost track, then many more consecutive holograms will overlap at the innermost track because this track is much shorter and rotational speed of the data carrier is constant. However, if the amount of overlap between adjacent multiplexed tracks is directly proportional to the length of one turn of a spiral or the length of one concentric track, then the total amount of hologram overlap (and therefore, the number of exposures per unit area) remains constant. This may be achieved by the simple exedient of gradually increasing the speed at which the object beam source (element 11 in FIG. 1) moves from position "a" to its final position "c" during the recording process; a rectangular aperture in the mask which is interposed between the object beam source and the photosensitive medium is similarily accelerated in movement during the recording process. Also, during playback the separate increments of rotational position of the photodetection system are nonuniform, being smaller for the outermost tracks and considerably larger for the innermost tracks. As further example FIG. 16A depicts the outermost tracks 18*abc* and FIG. 16B depicts the innermost tracks 18*xyz* on a data carrier rotating in the direction of the arrows; tracks 18*abc* contain holograms 19*a*, 19*b*, 19*c* and tracks 18*xyz* contain holograms 19*x*, 19*y*, 19*z* respectively. Only one hologram per track is depicted, but the amount of hologram overlap in the direction of rotation indicates the amount of overlap which would exist for consecutively recorded holograms (distance d). The amount of hologram overlap associated with adjacent multiplexed tracks is represented by distance d'. The total area of hologram overlap in FIG. 16A (shaded area d×d') is equal to the area of hologram overlap in FIG. 16B (shaded area d×d'). Therefore, data-storage density remains constant across the entire area of the recorded medium. Of course, each hologram would be overlapped many more times than is depicted for purposes of clarity in FIG. 16A and FIG. 16B.

The rectangular dimensions of the holograms, and the rectangular dimensions of the signal images which these holograms generate, are chosen so as to fulfill a variety of requirements. The configuration of the holograms results from the need to limit overlap between consecutively exposed areas on the rotating data carrier (defining hologram width), while at the same time providing sufficient data redundancy for purposes of resisting the effects of dust, scratches, etc. (defining hologram length); the latter dimension must also take into account the necessity for providing sufficient capacity for toleration of lateral misalignment between the hologram tracks and the photodetection system. A similar rectangular shape of the signal images results from the need to provide a space between consecutive signal images so as to sample multiplexed-induced noise by the differential photodetection system (defining maximum signal image width), while at the same time providing capacity for toleration of lateral misalignment between the signal images and the photodetector elements (defining signal image length).

Toleration of lateral misalignment between signal images and photodetector has been achieved in the embodiments discussed thus far by exploiting the elongated shape of the signal image; deviation of the signal image to the left or right of an exact dead-center position relative to a photodetection element does not result in signal loss because a portion of the elongated signal image still covers the entire photodetection element during signal detection. However, when coded reference beam multiplexing is employed to superimpose holograms upon a given area of photosensitive material the number of holograms which can be recorded without unduly compromising diffraction efficiency can be maximized if the images which these holograms generate are restricted to point sources of light, as is well known in the art. A photosensor array, comprised of a series of contiguous photosensitive elements as depicted in FIG. 17, suggests a further embodiment which permits toleration of lateral misalignment without resorting to elongation of the signal images. Here, we see a paired series of differentially-operating photosensitive elements 22 and 22', each series consisting of separate photosensitive elements a,b,c ... k and a',b',c' ... k, and each pair of photosensitive elements (a—a', b—b', etc.) operating differentially to separate signal images from uncorrelated noise as discussed previously. Moreover, the outputs of all of the differentially-operating pairs of photosensitive elements within the series are summed, the resulting quantity being representative of the instantaneous value within a sequence of correlated signal images 24 appearing along the signal image path (dotted arrow). This paired series of contiguous photosensitive elements comprising the photosensor array creates, in effect, a pair of elongated photodetectors which permit lateral dislocation of the signal image path. That is, signal images 24 can drift to the left or right, relative to the middle of the series of paired photosensitive elements a,b,c ... k and a',b',c' ... k, and still be detected by one or more of the paired elements. Even if a signal image partially covers two adjacent pairs, the resulting differential output of these two paired elements, after having been summed with all of the others in the series, will represent an accurate instantaneous value of this signal image; the remaining pairs detect only uncorrelated noise generated by overlapping multiplexed holograms occupying adjacent spiral paths on the data carrier, and, as previously discussed, produce output vlaues of zero quantity.

The length of the signal images ("length" being the dimension which is substantially perpendicular to the direction of motion of the signal images as imparted by rotation of the data carrier) employed in this embodiment approaches the dimension of point sources of light, thereby contributing to maximum diffraction efficiency of each superimposed hologram. Using signal images of narrow length, however, prevents the use of signal azimuth as a data conveyance, but signal image intensity, width (in the direction of signal image motion) and spatial frequency may be simultaneously utilized. Additionally, signal image position relative to the centerline of each signal image path may be used as a data conveyance if appropriate logic circuitry is employed which compares the present signal image position to those positions occupied by preceeding signal images. In FIG. 17 some of the signal images 24 appear to the right of the centerline of the signal image path (dotted arrow), and some images appear to the left of this position. Such circuitry as just mentioned could detect these abrupt positional changes of the signal images, but slower or erratic changes of signal image position would be interpreted by the circuitry as the result of lateral misalignment of the signal image path relative to the array of photosensitive elements; changes of signal image position occuring at a higher frequency or modulation of a center frequency would be interpreted as data. Circuitry which is appropriate for these purposes is well known in the art and is beyond the scope of this invention.

The photosensor array depicted in FIG. 17 can be used in a rotatable photodetection system incorporated into a playback apparatus as shown in FIG. 18. Here, we see a data carrier 7 rotating about axis 14, and one radial 20 of the data carrier being illuminated by a coherent radiation source 1. In this embodiment data carrier 7 has been provided with a reflective surface, permitting the photodetection system to be placed on the same side of the carrier as the source of the reconstruction beam, and further permitting the storage of data on both sides of the data carrier. Mirror 21 reflects signal images 24, generated by holograms occurring within radial 20 of data carrier 7, through lens system 12 which focuses these signal images upon photosensor array 30 comprised of pairs of contiguous photosensitive elements as discussed with reference to FIG. 17. Mirror 21, lens system 12 and photosensor array 30 are contained within cylindrical enclosure 23 which rotates (curved arrow) about its axis, permitting rapid access to any signal image path. Signal images occurring along signal image path Z, formed by holograms within the innermost track 18Z on the data carrier, and signal images occurring along signal image path A, formed by holograms within the outermost track 18A on the data carrier, are equidistant from mirror 21. Similarly, the optical path length between the photosensor array 30 and all signal image paths are equal.

Unlike the signal images used in previous embodiments the signal images appearing in FIG. 17 and FIG. 18 are not elongated in a direction substantially perpendicular to their motion as imparted by rotation of the data carrier. Lateral misalignment between signal images and the photodetection system results in movement of the signal images toward either end of the photosensor array 30, and this movement (straight arrow in FIG. 18) is tolerated as long as such movement of the signal images does not exceed the lengthwise dimension of the photosensor array. Not shown in FIG. 18 is the spatial modulation of the reconstruction beam, a feature of this invention which will be discussed again with reference to FIG. 19.

As with all embodiments of this invention the use of a reflective data carrier does not alter the optical path length between photodetector and signal image from that which would be obtained using a transparent data carrier and a reconstruction beam originating from the side of the data carrier opposite to that of the photodetection system, as is well known in the art. Moreover, such a reflective data carrier eliminates the necessity for an optically transparent turntable, a potential source of optical distortion and reconstruction beam attenuation. The recording of data in holographic form upon a rotating carrier, however, remains the same as previously discussed, the creation of copies of the master disc comprising an additional step of applying a reflective material to these copies.

The recording of quasi point-source-type signal images can be accomplished with a Pockels cell matrix as described previously with reference to FIG. 15A, B and C. In such a case all activated cells are restricted to a single vertical row one cell in width at any given instant. This row may occupy one of two positions relative to the vertical centerline of the Pockels cell matrix, thereby causing signal images to be created which vary about the signal image path centerline according to the nature of the recorded data. Also, the number of cells in each vertical row, the transmissiveness of the activated cells, and the spatial relationship of the vertical row relative to the top and bottom of the entire matrix can all be employed to create signal images which vary in width, amplitude and spatial frequency according to the nature of the recorded data.

It must be understood that all of the embodiments of this invention require that a narrow band on the data carrier, corresponding to one radial, be illuminated. This is advantageous because no necessity exists for maintaining correlation between illumination of a specific hologram and detection of the signal image generated by that hologram; all holograms on one radial of the data carrier are simultaneously illuminated.

Figure 19:
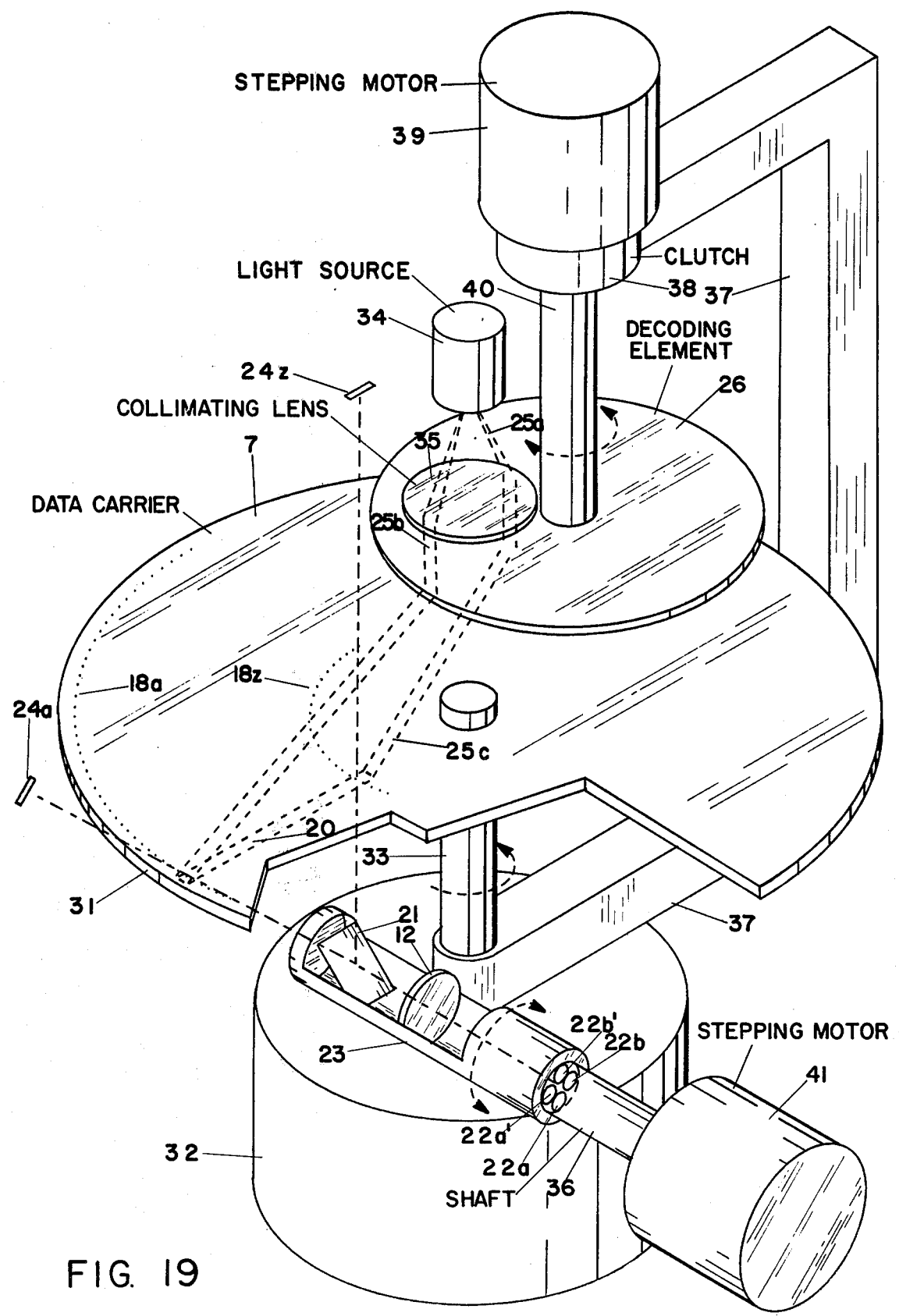
FIG. 19 depicts a playback mechanism which incorporates the novel features of this invention.

In way of summary FIG. 19 depicts a playback mechanism incorporating the novel features of one embodiment of this invention. The data carrier 7 is positioned on top of a transparent turntable 31 and rotated by motor 32 by way of shaft 33. Light source 34 delivers coherent light 25a to collimating lens 35, producing collimated reconstruction beam 25b which passes through rotating decoding element 26. This element consists of a transparent disc which is rotatable about its axis by way of shaft 40, and upon which has been inscribed a set of interference patterns (not shown) comprising an efficient hologram. These interference patterns are identical to those of an encoding element employed during the recording process, and spatially modulate the reconstruction beam 25b by diffracting it into a bundle 25c of spatially modulated rays. Such diffraction also causes a bending of the reconstruction beam in such a way as to direct 25c toward the rotating data carrier 7; other optical components (not shown) such as a cylindrical lens or slit-type mask may be necessary to further shape the bundle 25c into a narrow band during its progress toward 7. The spatially modulated rays comprising 25c illuminate a narrow area comprising one radial 20 of the rotating data carrier upon which have been recorded a plurality of overlapping holograms (not shown) in the form of a spiral track or series of concentric tracks (the outermost and innermost tracks being depicted in FIG. 19 as dotted lines 18a and 18z). The holograms overlap both in a direction parallel to a radial of the rotating data carrier and in a direction perpendicular to this radial in the manner previously discussed. Furthermore, these holograms form elongated virtual signal images (24a and 24z for example) which are detected by a photodetection system consisting of mirror 21, lens system 12, rotating cylindrical enclosure 23, two pairs of photodetection elements 22a–22a', 22b–22b' and associated circuitry (not shown). The rotational motion of the differential photodetection system is imparted by stepping motor 41 by way of shaft 36, this motion being in the form of discrete steps of nonequal amount, the smallest steps occuring when the photodetection system is directed toward the perimeter of the rotating data carrier, and the largest steps occuring when the photodetection system is directed toward the area upon the data carrier occupied by the shortest hologram tracks (such as 18z). These nonequal steps, and the reduction of 360 degree motion of stepping motor 41 to the range of rotary motion of the photodetection system (approximately 40 degrees) is accomplished by way of a gear or belt reduction assembly (not shown). Decoding element 26 is smoothly rotated at an appropriate rate by a linkage 37 between 26 and motor 32. Rapid changes of position of element 26 is effected by stepping motor 39 by way of shaft 40, the linkage 37 between 32 and 26 being disengaged by way of a conventional clutch mechanism 38 of well-known construction whenever 39 is activated. Both stepping motors 41 and 39, and clutch 38, are connected to a microprocessor (not shown) where instructions concerning activation of these electromechanical elements originate.

Virtual signal images 24a and 24z represent images formed by holograms in the outermost and innermost tracks on the rotating data carrier. The dash-dot lines in FIG. 19 represent the respective apparent paths from each virtual signal image to mirror 21 and thence to the photodetection elements 22a, 22a', 22b, 22b'. These paths are equidistant (although drawn nonequal in FIG. 19 for isometric purposes). It can be appreciated that these signal images could be substantially further away from the surface of the rotating data carrier as long as they all lie within the holograms' coherence volume, the size of which is determined primarily by the coherence length of the laser employed during hologram formation.

During continuous playback operation the relative rotational speeds of turntable 31 and decoding element 26 are such that one revolution of 31 is accompanied by sufficient rotational movement of 26 to effect a completely different spatial modulation of the rays comprising bundle 25c, the interference patterns inscribed upon 26 having been constructed so as to provide tolerance of positional inaccuracies of the decoding element relative to the data carrier, as previously discussed. Signal images, which were formerly correlated during one revolution of turntable 31, appear as uncorrelated noise during a subsequent revolution of 31, as do all signal images which are not associated with a particular position of the decoding element 26. During a given number of revolutions of turntable 31 decoding element 26 makes one complete revolution, at which point there has been created a sufficient amount of distance between signal images which are associated with a specific position of decoding element 26 so that the process described above can be repeated without causing detection of more than one of those signal images which are common to one radial of data carrier 7.

During the recording of rotating data carrier 7 a smooth transition from one track to the adjacent track was effected by the gradual movement of an object beam source (object 11 in FIG. 2 for example) through an arcuate path. No such smooth movement of the rotating cylindrical enclosure 23 is necessary to realize an uninterrupted signal (as would be required with audio and video data) since the transition from one track to an adjacent track is the function of the decoding element 26, cylindrical enclosure 23 being advanced periodically in small rotary increments by stepping motor 41. Alternately, movement of cylindrical enclosure 23 could be effected by a linkage (not shown) between 23 and motor 32, this linkage being capable of disengagement. During one revolution of data carrier 7 decoding element 26 rotates only to the extent necessary to effect a transition from one signal image path to an overlapping adjacent path; after a given number of revolutions of data carrier 7 (i.e. when the limit for toleration of lateral misalignment between signal image path and photodetector is reached) the differential photodetection system is advanced one rotary increment. However, when a specific portion of the rotating data carrier needs to be accessed, both stepping motors 41 and 39 rotate simultaneously to the required positions as instructed by the microprocessor, thereby providing access to any track on the rotating data carrier within a very short period of time. Also, by stopping movement of 41 and 39, and by disengaging the linkage 37, by way of clutch 38, between decoding element 26 and motor 32, a video "stop-frame" capability becomes possible if this particular frame of video information is temporarily stored in a solidstate memory (for example, a charge-coupled device); resumption of the video information may then occur at the precise point on the data carrier where motion was halted. Likewise, picture reversal, fast forward and fast reverse speeds, and slow motion effects are possible by varying the positions and stepping speeds of 41 and 39. The separate bands appearing on conventional LP records, which are userselectable by the positioning of a tone arm and stylus, can be similarily selected with this invention by issuing instructions to the microprocessor via a small keypad (not shown). When this invention is used as a read-only blockaccess data storage medium for a computer the positioning instructions delivered to 41 and 39 via the microprocessor are supplied by way of an input port (not shown). Without modification, one device may serve as a playback mechanism for either audio, video or computer data; indeed, all three types of data may be stored upon one rotating data carrier simultaneously.

While the above descriptions pertain to preferred embodiments of this invention, it will be understood by those skilled in the art that various changes in form and detail may be made to the apparatus without departing from the spirit and scope of the invention.

I claim:

1. Apparatus for playback from holographic storage on a data carrier in which holographic data is arranged in a predetermined pattern of linear arrays comprising:
  a data carrier receiver for receiving such a data carrier;
  a source of coherent radiation positioned relative to said data carrier receiver to illuminate such a data carrier thereon with an illumination pattern which is effective to illuminate any given linear array of holograms when that linear array is disposed within the illumination pattern and to form a signal beam comprising as constituents individual signals each corresponding to a corresponding hologram in that linear array,
  a reflector disposed in the path of said signal beam for altering the direction of said signal beam,
  photodetector means disposed in the path of the directionally altered signal beam,
  a lens disposed between said photodetector means and said reflector in the path of said directionally altered signal beam whereby said directionally altered signal beam is focused upon said photodetector means,
  means for selectively positioning said data carrier receiver and such a data carrier thereon relative to said source of coherent radiation to selectively position a selected one of said linear arrays of holograms on such data carrier into said illumination pattern;

and means for selectively positioning said reflector to cause a selected one of the holograms in such selected one of said linear arrays to impinge upon said photodetector means.

2. The invention as defined in claim 1 in which the predetermined pattern of linear arrays comprises a pattern of straight arrays.

3. The invention as defined in claim 1 wherein said arrays are arranged in a pattern in which the individual linear arrays are disposed on respective radials relative to a central axis of the data carrier.

4. Apparatus for playback from holographic storage on a data carrier which is adapted for rotation about a data carrier axis, said data carrier having a plurality of arcuate signal tracks each comprising a series of holograms and encircling said carrier axis, comprising a turntable adapted to receive said data carrier for rotation thereof about said carrier axis, a source of coherent radiation positioned relative to said turntable for emitting a reconstruction beam which illuminates the data carrier with an illumination pattern which includes a radially extending linear array of the holograms in said arcuate signal tracks to form a signal beam comprising as constituents individual signals each corresponding to a corresponding hologram in said linear array of holograms, a reflector disposed in the path of the signal beam for altering the direction of said signal beam and being mounted for rotation about a reflector axis which extends parallel to the plane of rotation of said data carrier and perpendicular to a plane containing said radially extending linear array of holograms, photodetector means disposed in alignment with said reflector axis and in the path of said directionally altered signal beam, a lens disposed in front of said photodetector means and in the path of said signal beam whereby said signal beam is focused upon said photodetector means, means for rotating said turntable to position said data carrier to cause a selected linear array of holograms to be disposed in said reconstruction beam, and means for rotating said reflector about said reflector axis to cause a particular individual signal from a particular hologram in the selected linear array to impinge upon the photodetector means.

5. The invention as defined in claim 4 wherein said reflector axis extends through the plane of said reflector and said photodetector means is disposed on a line extending perpendicular from said reflector axis.

6. The invention as defined in claim 4 wherein said means for rotating said reflector comprises a stepping motor.

7. The invention as defined in claim 4 wherein said means for rotating said reflector comprises a coupling between said means for rotating said turntable and said reflector, said coupling being capable of disengagement.

8. The invention as defined in claim 4 wherein said photodetector means comprises a pair of photodetectors spaced apart in the direction of motion of said signal images as imparted by rotation of said data carrier, and differential amplifying means connected with said pair of photodetectors for producing an output signal.

9. The invention as defined in claim 4 wherein said photodetector means comprises two pairs of photodetectors, each of said pairs spaced apart in the direction of motion of said signal images as imparted by rotation of said data carrier, said pairs disposed in adjacence, separate differential amplifying means connected to each of said pairs of photodetectors for producing two output signals, and means for comparing relative times of amplitude fluctuations of said two output signals.

10. The invention as defined in claim 4 wherein said photodetector means comprises a paired array of photodetectors, each of said pairs spaced apart in the direction of motion of said signal images as imparted by rotation of said data carrier, said paired array disposed perpendicular to said direction of motion of said signal images, and a separate differential amplifying means connected to each of said pairs of photodetectors comprising said array for producing output signals.

11. The invention as defined in claim 4 wherein at least some of said holograms on said data carrier overlap adjacent holograms in directions perpendicular to directions of rotational motion of said data carrier, said holograms being encoded by spatial modulation of the reference beam during formation of the holograms, said apparatus further comprising decoding means disposed in the path of said reconstruction beam for spatially modulating said reconstruction beam for each hologram in accordance with its encoding modulation whereby a correlated signal image formed by said hologram is distinguishable from uncorrelated signal images formed by said adjacent overlapping holograms.

12. The invention as defined in claim 4 wherein said reflector axis is disposed at an angle of 45 degrees through the plane of said reflector and said photodetector means is disposed on said reflector axis.

13. The invention as defined in claim 12 wherein said photodetector means is fixedly mounted relative to said reflector and is rotatable therewith.

14. The invention as defined in claim 4 wherein said holograms, when illuminated by said reconstruction beam, form a series of signal images disposed in a plurality of arcuate signal paths, said signal paths lying in different planes parallel to the plane of said data carrier, said planes of said paths having distances from the plane of said data carrier determined during holograms formation by movement of the object beam source in an arc having an axis perpendicular to a plane containing a radial of said data carrier and located in a plane parallel to the plane of said data carrier and on the side of the data carrier opposite that of the object beam source, said axis of said arc described by movement of said object beam source during hologram formation being coincident with axis of a signal image arc during playback, said reflector axis being coincident with said axis of said signal image arc.

15. The invention as defined in claim 14 wherein said data carrier is transparent, said reconstruction beam passing through said data carrier and forming said axis of said signal image arc on the side of the data carrier opposite the source of said reconstruction beam.

16. The invention as defined in claim 14 wherein said data carrier is reflective, said reconstruction beam being reflected from said data carrier and forming said axis of said signal image arc on the same side of said data carrier as the source of said reconstruction beam.

17. The invention as defined in claim 14 wherein each hologram on said data carrier overlaps adjacent holograms in directions perpendicular to the direction of rotational motion of said data carrier, said holograms being encoded by spatial modulation of the reference beam during formation of the holograms, said apparatus further comprising decoding means disposed in the path of said reconstruction beam for spatially modulating said reconstruction beam for each hologram in accordance with its encoding modulation whereby a correlated signal image formed by said hologram is distinguishable from uncorrelated signal images formed by said adjacent overlapping holograms.

18. The invention as defined in claim 17 wherein said decoding means includes a rotatably mounted decoding element disposed in the path of said reconstruction beam, and meansf for rotating said decoding element synchronously with said data carrier.

19. The invention as defined in claim 17 wherein said decoding means comprises a rotatably mounted decoding element disposed in the path of said reconstruction beam, and a stepping motor coupled with said decoding element whereby said decoding element may be rotatively displaced in discrete increments.

20. The invention as defined in claim 17 wherein said decoding element includes a rotatably mounted decoding element disposed in the path of said reconstruction beam, and a coupling between said means for rotating said turntable and said rotatably mounted decoding element, said coupling being capable of disengagement.

21. The invention as defined in claim 17 wherein said decoding means comprises a rotating transparent disc.

22. The invention as defined in claim 21 wherein said transparent disc comprises a plurality of lenses of varying focal lengths.

23. The invention as defined in claim 21 wherein said transparent disc consists of a hologram.

24. The invention as defined in claim 21 wherein said transparent disc consists of a kinoform.

* * * * *

UNITED STATES PATENT AND TRADEMARK OFFICE
CERTIFICATE OF CORRECTION

PATENT NO. : 4,420,829
DATED : December 13, 1983
INVENTOR(S) : John E. Carlson

It is certified that error appears in the above-identified patent and that said Letters Patent are hereby corrected as shown below:

Column 2, line 55, "purpose" should read --purposes--.

Column 5, line 29, "principals" should read --principles--.

Column 6, line 7, "or" should read --at--.

Column 11, line 17, "the" should read --and--.

Column 16, line 48, "vlaues" should read --values--.

Column 20, line 23, "userselectable" should read --user-selectable--.

Column 20, line 28, "blockaccess" should read --block-access--.

Column 23, line 7, "14" should read --4--.

Signed and Sealed this

Twenty-fourth Day of July 1984

[SEAL]

Attest:

GERALD J. MOSSINGHOFF

*Attesting Officer*  *Commissioner of Patents and Trademarks*